(12) United States Patent
Mitchell

(10) Patent No.: US 6,713,174 B2
(45) Date of Patent: Mar. 30, 2004

(54) TEAR TAPE

(75) Inventor: Paul R. Mitchell, Tyngsboro, MA (US)

(73) Assignee: Arlin Mgf. Co., Inc., Lowell, MA (US)

( * ) Notice: Subject to any disclaimer, the term of this patent is extended or adjusted under 35 U.S.C. 154(b) by 112 days.

(21) Appl. No.: 10/067,478

(22) Filed: Feb. 4, 2002

(65) Prior Publication Data

US 2002/0071950 A1 Jun. 13, 2002

Related U.S. Application Data

(63) Continuation-in-part of application No. 09/417,387, filed on Oct. 13, 1999.

(51) Int. Cl.$^7$ ................................................. B32B 15/04
(52) U.S. Cl. ...................... 428/343; 156/64; 156/173.1; 206/455; 264/176.1
(58) Field of Search ...................... 428/343; 264/176.1; 206/455; 156/64, 73.1

(56) References Cited

U.S. PATENT DOCUMENTS

| | | |
|---|---|---|
| 3,557,265 A | 1/1971 | Chisholm et al. |
| 3,562,041 A | 2/1971 | Robertson |
| 3,733,238 A | 5/1973 | Long et al. |
| 3,837,977 A | 9/1974 | Rust, Jr. |
| 3,844,869 A | 10/1974 | Rust, Jr. |
| 3,879,256 A | 4/1975 | Rust, Jr. |
| 3,993,532 A | 11/1976 | McDonald et al. |
| 4,083,737 A | 4/1978 | Foote, Jr. et al. |
| 4,152,387 A | 5/1979 | Cloeren |
| 4,197,069 A | 4/1980 | Cloeren |
| 4,362,773 A | 12/1982 | Shikinami |
| 4,400,227 A | 8/1983 | Riemersma |
| 4,404,052 A | 9/1983 | Persson et al. |
| 4,430,148 A | 2/1984 | Schaefer |
| 4,533,308 A | 8/1985 | Cloeren |
| 4,668,316 A | 5/1987 | Sager |
| 4,720,011 A | 1/1988 | Canamero |
| 4,765,117 A | 8/1988 | Akutsu et al. |
| 4,765,118 A | 8/1988 | Akutsu et al. |
| 4,781,296 A | 11/1988 | Morris et al. |
| 4,798,639 A | 1/1989 | Yamaguchi |
| 4,844,962 A | 7/1989 | May et al. |
| 5,203,935 A | 4/1993 | May et al. |
| 5,595,803 A | 1/1997 | May et al. |
| 5,711,847 A | 1/1998 | Rajala et al. |
| 5,733,411 A | 3/1998 | Bett |
| 5,749,987 A | 5/1998 | Wannebo |
| 5,843,253 A | 12/1998 | Stivani et al. |
| 5,871,605 A | 2/1999 | Bett |
| 6,097,907 A * | 8/2000 | Fujiwara ..................... 399/106 |

FOREIGN PATENT DOCUMENTS

| | | |
|---|---|---|
| CA | 1225946 | 8/1987 |
| EP | 0121371 B2 | 6/1984 |

OTHER PUBLICATIONS

Data Sheet, LY 6100 General Purpose Polypropylene Homopolymer Resin for Extrusion. Montell Technology Company BV. Aug., 1998.

Technical Data Sheet, Product No. HL–2693. H.B. Fuller Company. May 17, 2001.

Selector Guide, Elvax® ethylene–vinyl acetate copolymer resins. DuPont. Jan. 28, 2002.

Product Information, Dow Corning® MB50–001 Masterbatch. Dow Corning. Prior Art.

* cited by examiner

Primary Examiner—Terressa Boykin
(74) Attorney, Agent, or Firm—Fish & Richardson P.C.

(57) ABSTRACT

A coextruded elongated tear tape comprises at least one layer of thermoplastic resin material monoaxially oriented in the longitudinal direction of the tape and a layer comprising adhesive. The method of making material for the tear tape comprises coextruding the layers. Apparatus for sealing tear tape to packaging material comprises an ultrasonic transducer and an anvil roll, the anvil roll having indicia representative of information formed in relief on the surface thereof and aligned with the path of the tear tape for embossing the indicia thereon. The embossing method comprises passing tape and thermoplastic resin packaging over the anvil roll and heating them to seal the tape to the packaging and to deform them into the indicia.

21 Claims, 3 Drawing Sheets

TEAR TAPE

RELATED APPLICATION

This is a continuation-in-part of application Ser. No. 09/417,387, filed Oct. 13, 1999.

BACKGROUND OF THE INVENTION

This invention relates to tear tape and more particularly to multilayer thermoplastic resin tear tapes, the method of making tear tape and to apparatus for and the method of embossing tear tape with indicia representative of information.

Tear tapes for opening packaging are well known. They are typically adhered to the packaging material with one end exposed. The tape may therefore be pulled to tear and open the packaging when desired.

Polypropylene is the material of choice for many tear tape applications. To adhere the polypropylene tear tape to packaging material, which often is also polypropylene, adhesives are typically utilized as coatings on the tear tape. In the past, lacquer has been coated on the tear tape and a solvent applied to activate the lacquer as the tear tape is applied to the packaging. Another system employed has been coating the tear tape with a wax which is heated to adhere the tear tape to the packaging. Pressure sensitive adhesives coated on the tear tape have also been employed. In yet another system, hot melt adhesive has been coated on both sides of the tear tape and is activated by heat resulting from activation of an ultrasonic transducer.

The application of coatings to the tear tape material, however, involves extra processing steps, the need to control coating stations and hazards resulting from exposed materials, particularly those involving flammable materials or noxious fumes. Tear tape with a pressure sensitive adhesive coating has required careful control of tear tape tension as it is unwound from a roll and, indeed, often is employed with a powered unwind station due to the tension resulting from drawing tape from a roll where the tape is contacted by an underlying coated layer of pressure sensitive adhesive.

Counterfeiting is also an issue in product manufacturing. Thus it is desirable that packaging be identified in a unique manner to indicate a source of genuine product. Additionally, quality control is enhanced when product packaging is uniquely identified.

SUMMARY OF THE INVENTION

In one aspect, the invention relates to an elongated tear tape of thermoplastic resin material coextruded with at least one outer layer comprising either a hot melt adhesive or a pressure sensitive adhesive.

In embodiments employing a hot melt adhesive, the tear tape comprises a plurality of, preferably, three coextruded layers of thermoplastic material monoaxially oriented in the longitudinal direction of the tape, the two outer layers each comprising thermoplastic material and the hot melt adhesive. The hot melt adhesive in the outer layers comprises up to 25% thereof and preferably from 5 to 15% and, in certain applications, preferably about 10% thereof. A preferred hot melt adhesive is an ethylene vinyl acetate based adhesive.

In embodiments of tape employing a pressure sensitive adhesive, the tear tape comprises two or three coextruded layers of thermoplastic material monoaxially oriented in the direction of the tape, one outer layer comprising the pressure sensitive adhesive. The pressure sensitive material in the one layer comprises up to 25% and, in most applications, from 5 to 10% of the thickness of the tape. A preferred pressure sensitive adhesive is a styrene-isoprene-styrene based adhesive. The other outer layer of the tape comprises thermoplastic material and a release agent, preferably an ultra high molecular weight silicone polymer. The silicone comprises from 0.1 to 5% of the other layer. In a three layer tape, the inner layer is thermoplastic resin material.

In another aspect the invention relates to the method of making the foregoing tear tapes by coextruding a layer of thermoplastic resin material with at least one outer layer comprising the hot melt or pressure sensitive adhesive. In preferred embodiments, the tear tape employing hot melt adhesive is coextruded in three layers with thermoplastic material and adhesive in the two outer layers. The tear tape with pressure sensitive adhesive is coextruded in two or three layers with the adhesive in one layer and, preferably, with the other outer layer comprising thermoplastic material and a release agent; if formed in three layers, the internal layer comprises thermoplastic material.

In another aspect the invention relates to apparatus for bonding the tear tape with hot melt adhesive to packaging material and for embossing indicia representative of information thereon. The apparatus comprises an ultrasonic transducer for heating the material and an anvil roll in close proximity thereto. Indicia are formed in relief on the roll aligned with the path of the tear tape as it moves with the packaging between the transducer and the roll where by energy generated by the transducer heats the tape and packaging causing them to be deformed into and to be embossed with the indicia. A flanged roll preferably guides the tape in its path. Preferably, also, the relief indicia in the roll have a depth of from 0.0005 to 0.005 inches, sufficiently deep to emboss the indicia on the tape but not so deep as to lose character definition.

In yet another aspect, the invention relates to the method of embossing indicia representative of information in the tear tape. The method comprises passing the tape over an anvil roll having the indicia formed in relief in the roll surface, sealing the tape to packaging material and causing the tape and packaging to deform into the indicia. The tape is preferably guided to the path of the indicia.

Advantageously, tear tape according to the invention requires no separate coating or coating step in its manufacture. The inclusion of adhesive in the tape speeds the rate of production relative to ultrasonic bonding without adhesive. Additionally, controlling tape tension as it is unwound is less critical when hot melt adhesive is utilized than when pressure sensitive adhesive coatings are utilized. The provision of hot melt adhesive in both sides of the tape assures proper bonding even when the tape is twisted from one side to the other. On the other hand, the provision of pressure sensitive adhesive in one side of the tape and a release agent in the other side of the tape, both renders control of tape tension less critical and avoids the need to heat the adhesive for its activation. Embossing information on the tear tape permits identification of source to enhance detection of counterfeit product.

Other objects, advantages and features of the invention will be apparent from the following description of preferred embodiments taken together with the accompanying drawings, in which:

DESCRIPTION OF THE PREFERRED EMBODIMENTS

Figure 1:
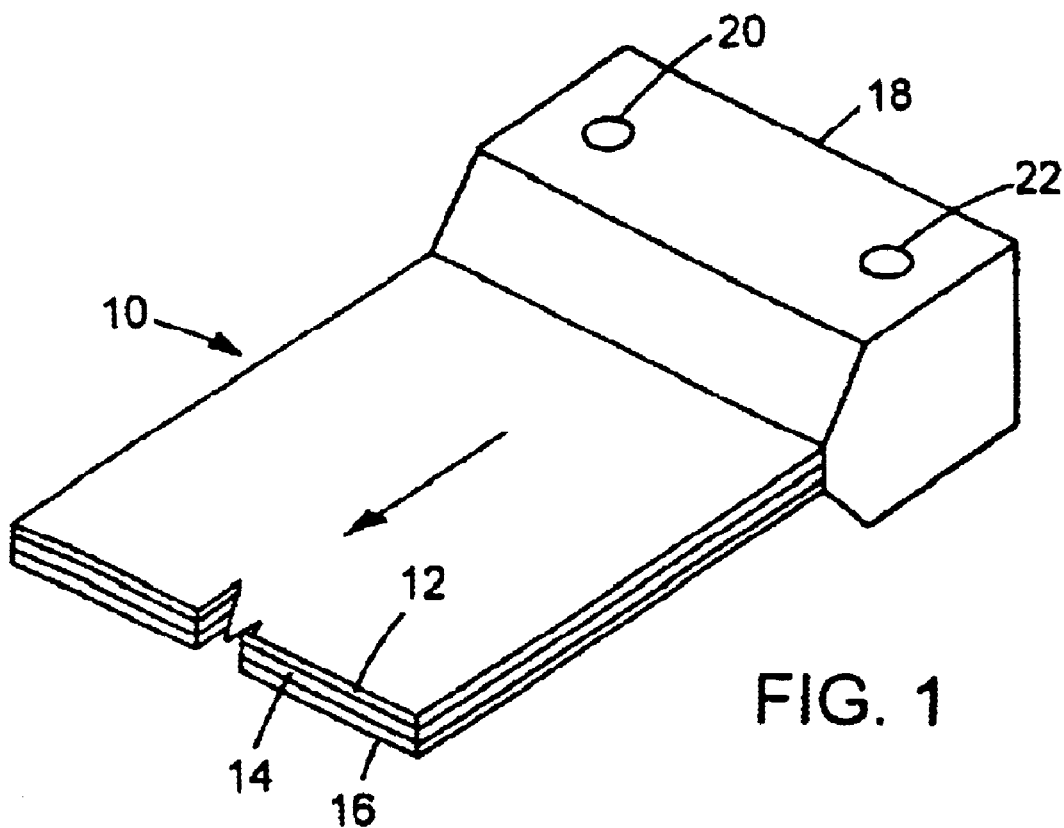
FIG. 1 is a diagrammatic perspective view of one embodiment of tear tape material and an extruder head used in forming the material.

Referring to the drawings and more particularly to FIG. 1, tear tape material 10 of one embodiment, having three coextruded layers 12, 14, 16, is extruded from an extruder head 18. The extruder head 18 has two inlet ports 20, 22, one of which 20 feeds the material for the center layer 14 of the tear tape material and the other of which 22 feeds the material through internal passages (not shown) for both outer layers 12, 16 of the tear tape material. Alternatively, there could be separate ports for feeding material for each of outer layers 12, 16 as well as for center layer 14. Extruder heads for coextruding multilayer materials are known in the art, see, e.g., U.S. Pat. Nos. 3,557,265; 4,152,387; 4,197,069 and 4,533,308. Extruder heads for feeding three layers from two or three ports are available from Cloeren, Inc. of Orange, Tex.

The tear tape material comprises thermoplastic resin material which, preferably, can be monoaxially oriented after it is extruded. A preferred material for the center layer 14 fed through port 20 of extruder head 18 is polypropylene homopolymer. Suitable polypropylene homopolymer is product LY6100 obtained from Basell USA, Inc. of Wilmington, Del. The outer layers 12, 16 of the tear tape material are formed from a mixture of the thermoplastic material and a hot melt adhesive. The materials of the various layers of the coextruded material are selected such that the layers have similar viscosities. In a particular embodiment the center layer 14 comprises about 80% and the outer layers comprise about 10% each of the thickness of the tear tape material. The center layer 14 may be substantially free of adhesive except at the boundary with outer layers 12, 16 where there may be some migration of the outer layers into the boundary portions of the center layer as the coextruded fluid materials mix to a degree at the boundary portions during the coextrusion process. Alternatively, some recycled material may be utilized in the center layer 14 which may then contain up to about 5% adhesive. Preferred materials for the outer layers 12, 16 are polypropylene homopolymer resin (described above) as the thermoplastic material and ethylene vinyl acetate based adhesive as the hot melt adhesive fed through port 22 of the extruder head 18. Suitable ethylene vinyl acetate based adhesive is sold by E. I. duPont de Namours and Company, Wilmington, Del., as Elvax® 260 or Elvax® 265. Additives may be incorporated in the adhesive to modify its characteristics. The mixture of thermoplastic material and hot melt adhesive may comprise 25% by weight adhesive but preferably is in the range of from 5 to 15% and most preferably 10% adhesive in applications involving tear tapes for cigarette packaging. The amount of adhesive is selected primarily based on a determination of cost versus benefit. Thus higher amounts of adhesive may increase the rate at which tape can be sealed to packaging, as contemplated herein, whereas lower amounts of adhesive reduce material costs. The amount of adhesive is selected to balance cost versus any increased production rate achievable with the particular equipment in use and the requirements of the materials employed, including the packaging material.

The tear tape material 10 is extruded from extruder head 18 as a continuous sheet of substantial width, e.g., about 15 to 80 inches wide. The width is selected based on the number of tear tapes desired and their individual widths. For tapes having a final width of ¹⁄₁₆ inch a 15 inch wide sheet is preferred. Following extrusion and cooling the tear tape material is slit to a predetermined width. The slit tear tape material is then passed through a heated oven and (not shown). Rollers on either side of the oven stretch the material in a known manner to about 500% of its original length to thereby monoaxially orient the material in the longitudinal direction of the tape and to reduce the tape to its desired width and thickness (e.g., ¹⁄₁₆ to ¼ inch wide by 1.5 to 3 mils thick). The width and thickness of the tape are selected based on the application for the tape. For cigarette packaging, a tape width of ¹⁄₁₆ inch and a tape thickness of 1.75 mils are preferred, although the thickness may range from 1.5 to 2.2 mils. Wider and thicker tapes may be required for more rugged applications. Thereafter, the slit and oriented material is wound on cores or reels (not shown) for use with packaging material as described hereafter.

Figure 2:
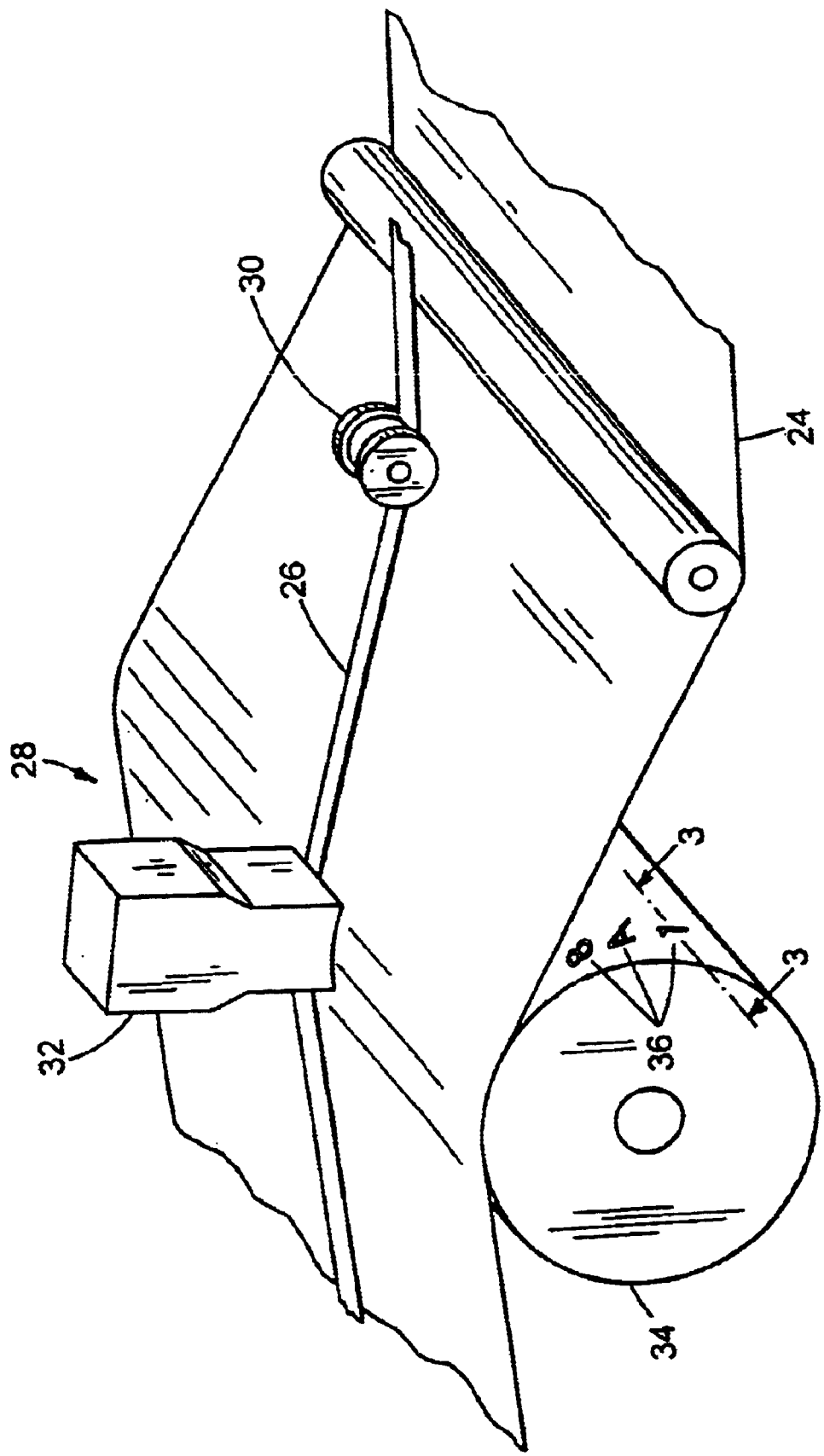
FIG. 2 is a diagrammatic perspective view of apparatus used for sealing the tear tape to packaging and for embossing information on the tear tape.

After the tape material has been wound on cores or reels, it is fed to ultrasonic sealing apparatus for bonding to packaging material 24. The packaging may be polypropylene, polyethylene or other thermoplastic resin material or may be other material, e.g., paper, to which the adhesive will adhere when activated by heat. As illustrated in FIG. 2, the tear tape 26, formed and slit as described above, is fed to the sealing apparatus 28. A flanged guide roll 30 locates the tape along a predetermined path of travel into surface engagement with the packaging material 24 as the tape and packaging material enter the sealing apparatus 28.

As illustrated in FIG. 2, the sealing apparatus 28 comprises an ultrasonic transducer 32 and an anvil roll 34 in close proximity, thereto. Anvil roll 34 has a width at least as great as that of the packaging material 24, e.g. 4.5–7 inches for typical cigarette packaging. In the illustrated embodiment the tear tape 26 overlies the packaging material 24 on a portion of anvil roll 34 as the roll turns to draw the packaging material and the tear tape to a position between the anvil roll 34 and the transducer 32. If desired the tear tape could, alternatively, be fed under the packaging material to the transducer 32. In any event, operation of the ultrasonic transducer heats the tear tape 26, activating the adhesive in outer layers 12, 16 and bonding the packaging material 24 to the one of outer layers 12, 16 of the tear tape 26 in contact therewith.

Figure 3:
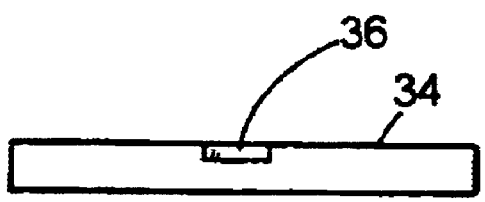
FIG. 3 is a diagrammatic fragmentary sectional view of the anvil roll illustrated in FIG. 2 taken along the line 3—3 of FIG. 2.

As illustrated in FIGS. 2 and 3, if thermoplastic resin packaging material such as polypropylene or polyethylene is utilized, the anvil roll may have a plurality of recesses 36 on the surface thereof aligned with the path of the tear tape 26 as it passes through the sealing apparatus 28. For convenience of illustration, FIG. 2 shows recesses 36 near the end of anvil roll 34; it will be understood, however, that the recesses underlie the tape 26 as it passes over the anvil roll 34. The recesses 36 may be alphanumeric characters or a pattern or patterns comprising indicia representative of information, e.g., the plant where and/or the machine on which the packaging is formed with the tear tape. Other information, such as security codes may be represented by the indicia. The recesses defining the indicia may be laser engraved or chemically etched in the surface of the roll, preferably to a depth of from 0.0005–0.005 inch when used with a ¹⁄₁₆ inch width tear tape having a thickness of from 0.0015–0.0022 inch overlying packaging having a thickness of from 0.0007 to 0.001 inch, dimensions which are typical with cigarette packaging. When the transducer 32 of the sealing apparatus 28 operates, it causes the tear tape 26 and the packaging 24 to be heated causing flow of the thermoplastic materials into the recesses 36 defining the indicia and thereby embossing them with the indicia. The indicia are preferably centered in the path of the tear tape and in a particular embodiment have a maximum width of about one half the width of the tear tape, e.g., about 1/32nd inch for a 1/16 inch width tear tape. The height of the indicia may be variable.

Advantageously, the use of a hot melt adhesive in the outer layers of the tape avoids the necessity of separately coating the tape with adhesive and avoids the issues of tape tension involved when tape is pre-coated with pressure sensitive adhesive. Although the tape could be bonded to thermoplastic packaging without any adhesive by ultrasonic sealing, the use of hot melt adhesive increases the speed of production. Although only one side of the tape is bonded to the packaging the provision of adhesive on both sides assures that adhesive bonding will occur in the event the tape is twisted from one side to the other. The embossing of indicia representative of information on the tear tape, provides a means for identification of source and information which can aid in determining the genuineness of product relative to counterfeit product.

Figure 4:
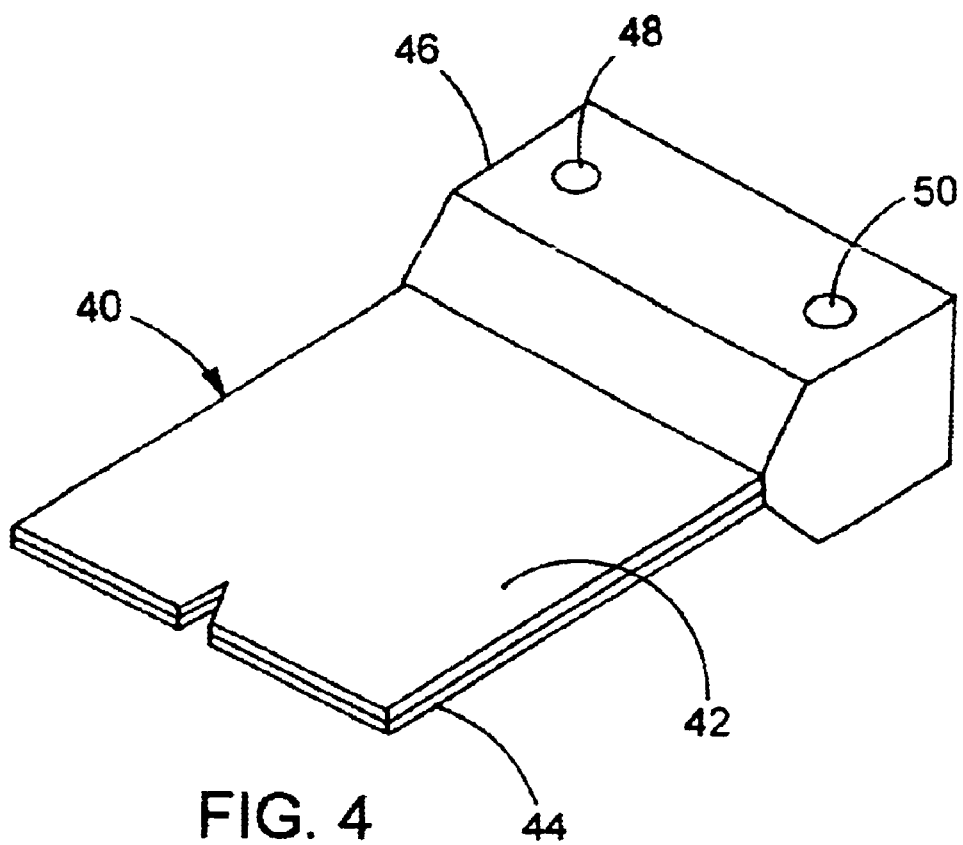
FIG. 4 is a diagrammatic perspective view of another embodiment of tear tape material and an extruder head used in forming the material.

In another embodiment, illustrated in FIG. 4, tear tape material 40 comprises two coextruded layers 42, 44, extruded from an extruder head 46, each layer forming one outer layer of the tear tape material. The extruder head 46 has two inlet ports 48, 50, each port feeding material for one of the layers 42, 44.

As in the prior embodiment, the tear tape material comprises thermoplastic resin which, preferably, can be monoaxially oriented after it is extruded. The materials of the layers of the coextruded material are selected such that the layers have similar viscosities. One layer 42 of the tear tape material is formed from a pressure sensitive adhesive. Unlike the prior embodiment, the adhesive is not mixed with thermoplastic resin material. Preferred materials for the layer 42 are styrene-isoprene-styrene based adhesive as the pressure sensitive adhesive. A suitable such adhesive is product number HL-2693 obtained from H. B. Fuller Company, St. Paul, Minn. Alternatively, the adhesive may be styrene-butadiene-styrene or a mixture of styrene-isoprene-styrene and styrene-butadiene-styrene. In any case, additives may be incorporated to modify the characteristics of the adhesive. The pressure sensitive adhesive layer may comprise 25% of the thickness of the tape but preferably is in the range of from 1 to 10% and most preferably 8% of the thickness of the tape in applications involving tear tape for cigarette packaging. The thickness of pressure sensitive adhesive layer is selected primarily based on the task to be performed, e.g., more adhesive may be employed if the packaging material is a sturdy envelope than is employed when the packaging is thin plastic film as in cigarette packaging. The other layer 44, of the tear tape material is, preferably, formed from a mixture of the thermoplastic material and a release agent. Preferred materials for the layer 44 are polypropylene homopolymer resin, above described, and an ultra high molecular weight silicone polymer (i.e., having a molecular weight approaching one million). In a particular embodiment, the silicone polymer employed is a polydimethylsiloxane obtained as a component of Dow Corning® MB50-001 Silicone Masterbatch obtained from Dow Corning Corporation, Midland, Mich.; the Dow Corning® MB50-001 Silicone Masterbatch material contains 50% of the silicone polymer dispersed in polypropylene. The mixture of thermoplastic material and release agent preferably comprises 0.1 to 5%, most preferably 1.25%, by weight of the silicone polymer release agent, requiring, in the case of the 50% silicone polymer mixture of the Dow Corning product, the addition of from 0.2 to 10% of the product to the thermoplastic material. The amount of release agent is selected primarily based on providing an amount effective to essentially prevent blocking (the adherence of adjacent layers when wound on a core or reel) and to essentially prevent transfer of adhesive between adjacent tape portions where one overlies the other when wound on a core or reel. In applications involving a thick tear tape, a third layer of thermoplastic resin may be coextruded between the two outer layers, thus avoiding the unnecessary cost which would be incurred by increasing the thickness of the outer layers containing adhesive or release agent.

As in the first embodiment, the tear tape material 40 is extruded as a continuous web of substantial width, e.g., about 15 to 80 inches wide. Following extrusion and cooling the tear tape material is slit to a predetermined width. The slit tear tape is then passed through a heated oven (not shown). Rollers on either side of the oven stretch the material in a known manner to about 500% of its original length to thereby monoaxially orient the material in the longitudinal direction of the tape and to reduce the tape to its desired width and thickness, e.g., 1/16 to 1/4 inch wide by 1.5 to 3 mils thick. For cigarette packaging, the tapes with pressure sensitive adhesive have a thickness of 1.75 to 2.3 mils, preferably 2 mils. Thereafter, the slit and oriented material is wound onto cores or reels (not shown) for use with packaging material as described hereafter. Since an adhesive layer is only on one side of the tape, care is taken to assure that the tape does not twist as it is wound onto a core or reel. This is accomplished in a known manner by biasing the tape as it reaches the core or reel against the underlying material with a roller with sufficient pressure to maintain the roller contact with the tape and, hence, the tape with the underlying material, throughout the winding process, to prevent any twist from propagating to the tape on the core or reel. In processing and winding the tape the pressure sensitive adhesive side of the tape, to the extent feasible, is maintained out of contact with machinery and in winding, preferably, the adhesive side faces the interior of the reel.

In use, the tape is fed from a core or reel to the position of packaging material for adhesive bonding contact therewith. If indicia are to be embossed, the tape may be adhered to the packaging material at an anvil roll such as roll 24 illustrated in FIG. 2 and fed between the anvil roll and ultrasonic transducer 32, as also illustrated in FIG. 2. If no indicia is to be embossed, the tape may join the packaging material as it moves along, e.g., in a linear path in a know manner.

Advantageously, the use of pressure sensitive adhesive in one layer of a tape not only avoids the necessity of separately coating the tape with adhesive, it also avoids the need for equipment, such as an anvil roll and an ultrasonic transducer solely to activate the adhesive (though they may still be used, if desired, for embossing indicia). The provision of adhesive in one layer together with a release agent in the other layer reduces issues of tape tension relative to coated tapes without a release agent and minimizes the need for using a powered unwind station.

Other embodiments of the invention will occur to those skilled in the art. For example, different adhesives might be employed provided they are compatible with other materials employed and provided they have a viscosity similar to that of the other materials.

What is claimed is:

1. The method of making a multilayer tear tape material comprising coextruding a layer comprising thermoplastic resin material and an outer layer comprising adhesive.

2. The method claimed in claim 1 in which the outer layer comprises thermoplastic resin and hot melt adhesive and the adhesive comprises up to and including 25% by weight of the outer layer.

3. The method claimed in claim 2 in which the adhesive is a hot melt adhesive and comprises from 5 to 15% by weight of the outer layer.

4. The method claimed in any one of claim 2 or 3 in which the adhesive comprises ethylene vinyl acetate based adhesive.

5. The method claimed in any one of claim 1, 2 or 3 comprising providing thermoplastic resin material and separately providing thermoplastic resin material and a hot melt adhesive and coextruding the materials to form a tape having at least three layers, an inner layer of thermoplastic resin material and two outer layers comprising thermoplastic resin material and hot melt adhesive.

6. The method claimed in claim 5 in which the hot melt adhesive comprises ethylene vinyl acetate based adhesive.

7. The method claimed in claim 1 in which the adhesive is a pressure sensitive adhesive and comprises up to and including 25% of the thickness of the tape.

8. The method claimed in claim 7 in which the adhesive is a pressure sensitive adhesive and comprises from 1–10% of the thickness of the tape.

9. The method claimed in any one of claim 7 or 8 in which the adhesive comprises styrene-isoprene-styrene based adhesive.

10. The method claimed in any one of claim 1, 7 or 8 comprising providing a pressure sensitive adhesive and separately providing thermoplastic resin material and a release agent and coextruding the adhesive and the mixture to form a tape having one outer layer comprising pressure sensitive adhesive and a second outer layer, opposite the one outer layer, comprising thermoplastic resin material and release agent.

11. The method claimed in claim 10 in which the release agent comprises a silicone polymer.

12. The method claimed in claim 11 in which the release agent is an ultra high molecular weight silicone polymer.

13. The method claimed in claim 12 in which the silicone polymer is polydimethylsiloxane.

14. The method claimed in claim 13 in which the silicone polymer comprises 0.1 to 5% by weight of the second outer layer.

15. The method claimed in claim 14 in which the silicone polymer comprises 1.25% by weight of the second outer layer.

16. Ultrasonic sealing apparatus for bonding a thermoplastic resin tear tape to thermoplastic resin packaging material and for embossing indicia thereon comprising an ultrasonic transducer and an anvil roll rotatably mounted in close proximity to the transducer in which the roll has indicia representative of information formed in relief in the surface of the roll, the indicia aligned with the path of the tear tape as it is to be moved with the packaging between the transducer and the roll, whereby operation of the transducer heats the tape and packaging to bond together and to deform into and to be embossed with the indicia.

17. The apparatus claimed in claim 16 in which the indicia have a relief depth in the roll surface in the range from 0.0005 to 0.005 inches.

18. The apparatus claimed in either one of claims 16 or 17 in which a flanged guide roll is positioned in front of the anvil roll to guide the tape in the path.

19. The apparatus claimed in claim 18 in which the indicia are centered on the path of the tape.

20. The method of embossing indicia on thermoplastic resin tear tape as it is adhered to thermoplastic resin packaging material comprising the steps of passing the tape and the packaging material over an anvil roll having indicia representative of information formed in relief in the surface of the roll, heating the tape and packaging material and thereby sealing the tape to the packaging material and causing the tape and packaging material to deform into the indicia, thereby embossing the indicia onto the tape.

21. The method claimed in claim 20 including the step of guiding the tape in the path of the indicia on the anvil roll.

* * * * *

UNITED STATES PATENT AND TRADEMARK OFFICE
CERTIFICATE OF CORRECTION

PATENT NO.    : 6,713,174 B2                              Page 1 of 1
DATED         : March 30, 2004
INVENTOR(S)   : Paul R. Mitchell It is certified that error appears in the above-identified patent and that said Letters Patent is hereby corrected as shown below:

Column 7,
Lines 5, 33 and 36, replace "claim" with -- claims --.

Signed and Sealed this

Sixteenth Day of November, 2004

JON W. DUDAS
*Director of the United States Patent and Trademark Office*